United States Patent [19]
Karube et al.

[11] Patent Number: 5,022,039
[45] Date of Patent: Jun. 4, 1991

[54] GAS LASER OSCILLATOR DEVICE

[75] Inventors: Norio Karube, Machida; Tsutomu Funakubo, Fujiyoshida, both of Japan

[73] Assignee: Fanuc Ltd, Minamitsuru, Japan

[21] Appl. No.: 476,411

[22] PCT Filed: Sep. 29, 1989

[86] PCT No.: PCT/JP89/01005
§ 371 Date: May 30, 1990
§ 102(e) Date: May 30, 1990

[87] PCT Pub. No.: WO90/04274
PCT Pub. Date: Apr. 19, 1990

[30] Foreign Application Priority Data

Oct. 13, 1988 [JP] Japan ................................ 63-258055
Nov. 26, 1988 [JP] Japan ................................ 63-298499

[51] Int. Cl.$^5$ ................................ H01S 3/22
[52] U.S. Cl. ................................ 372/58; 372/59
[58] Field of Search ................................ 372/58, 59

*Primary Examiner*—Léon Scott, Jr.
*Attorney, Agent, or Firm*—Staas & Halsey

[57] ABSTRACT

A turbo blower for a laser comprises a motor which includes a shaft (17) having a distal end to which a turbo impeller (16) is mounted, a pair of bearings (22,23) for supporting the shaft (17), a rotor (19(, and a stator (20). A squeezed-film damper (36,37) is provided around each of the bearings (22,23), whereby vibration of the blower is damped. The damping coefficient of the squeezed-film dampers (36,37) are different from each other, whereby vibration at the bearing is reduced.

13 Claims, 3 Drawing Sheets

GAS LASER OSCILLATOR DEVICE

BACKGROUND OF THE INVENTION

1. Field of the Invention

The present invention relates to a high-power gas laser oscillator device such as a machining $CO_2$ laser or the like, and more particularly, to a gas laser oscillator device provided with an improved turbo blower for use in a $CO_2$ laser.

2. Description of the Related Art

FIG. 3 shows an arrangement of a conventional $CO_2$ laser which includes an electric discharge tube 1 having an output coupling mirror 2 and a total reflection mirror 3 that are positioned at opposite ends of the electric discharge tube 1. Two metal electrodes 4 and 5 are arranged on the outer circumference of the electric discharge tube 1, and when a high-frequency voltage is applied between the metal electrodes 4 and 5 from a high-frequency power supply 6, a high-frequency glow discharge is produced in the electric discharge tube 1 for laser excitation. A laser beam axis in the electric discharge tube 1 is indicated at 13, and a laser beam axis extending out of the tube 1 from the output coupling mirror 2 is indicated at 14.

To start the laser oscillator device, a gas in the device is first evacuated by a vacuum pump 12, and then a valve 11 is opened to introduce a predetermined amount of laser gas from a gas container 10 into the device until the pressure of the gas in the device reaches a prescribed pressure level. Subsequently, the device is continuously evacuated by the vacuum pump 12 and continuously replenished with the laser gas through the valve 11. The laser gas in the device is therefore continuously replaced with a fresh gas while the gas pressure in the device is kept at the prescribed pressure level, and accordingly, contamination of the laser gas in the device is prevented.

In FIG. 3, the laser gas is circulated in the device by a Roots blower 9, whereby the laser gas is cooled. In a $CO_2$ laser, about 20% of the applied electric energy is converted into a laser beam and the rest is consumed to heat the laser gas, but theoretically, since the gain of laser oscillation is proportional to the minus (3/2)th power of the absolute temperature T, it is necessary to forcibly cool the laser gas to increase the oscillation efficiency. In the illustrated device, the laser gas flows through the electric discharge tube 1 in the direction indicated by the arrows at a speed of about 100 m/sec., and is introduced into a cooling unit 8. The cooling unit 8 removes most of the heat energy produced by the electric discharge from the laser gas. Further, since the Roots blower 9 heats the laser gas when compressing same, the laser gas from the Roots blower 9 is passed through a cooling unit 7 before the laser gas is again introduced into the electric discharge tube 1. The cooling units 7 and 8 will not be described in detail as they are well known in the art.

The above conventional laser oscillator device has the following problems: First, since the Roots blower is a low-speed volumetric blower, it is large in size and weight, and thus the laser oscillator itself is large; second, the Roots blower emits a pulsating gas flow, and the laser oscillation characteristics are affected by this pulsating gas flow; and third, the Roots blower produces vibrations which adversely affect the spot positioning stability of the laser beam.

If a turbo blower is used instead of a Roots blower, however, it may be damaged due to resonance when rotated at a high speed.

SUMMARY OF THE INVENTION

It is an object of the present invention to provide a gas laser oscillator device which employs a turbo blower and in which resonance during a high-speed operation is prevented.

Another object of the present invention is to provide a turbo blower for a laser in which vibration of the bearings and shaft is reduced to maintain a high-quality laser beam.

Still another object of the present invention is to provide a turbo blower for a laser, which blower has a prolonged service life and can withstand a high-speed rotation operation due to the reduction in vibration.

The present invention achieves the above objects by providing a gas laser oscillator device having an electric discharge tube for producing an electric discharge in a laser gas contained in the electric discharge tube for laser excitation, an optical resonator for effecting a laser oscillation, and a gas circulating device having a gas blower and a cooling unit for forcibly cooling the laser gas. The gas blower comprises a turbo impeller rotatable in the laser gas and an electric motor for driving the turbo impeller, the electric motor having bearings provided with a squeezed-film damper filled with grease.

According to another aspect of the invention, there is provided a turbo blower for a laser, comprising a motor which includes a shaft having a distal end to which a turbo impeller is mounted, a pair of bearings supporting the shaft, a rotor, and a stator. The turbo blower has a squeezed-film damper provided around each of the pair of bearings, with the damping coefficient of one squeezed-film damper being different from that of the other.

Further, since a turbo blower is used, the size thereof, which is in inverse proportion to the rotational speed, can be reduced. Further, vibration of the blower is prevented by a damping effect provided by the inelasticity of the grease, etc., of the squeezed-film dampers around the bearings.

Moreover, the squeezed-film dampers provided around the bearings of the turbo blower of the laser serve to absorb the vibration of the bearings. Further, by making the damping coefficient of one squeezed-film damper smaller than that of the other, the mode of vibration of the shaft at a critical speed can be varied, to thereby reduce stress produced in a portion of the shaft close to the bearing, and thus permit high-speed rotation of the blower.

DESCRIPTION OF THE PREFERRED EMBODIMENT

Figure 1:
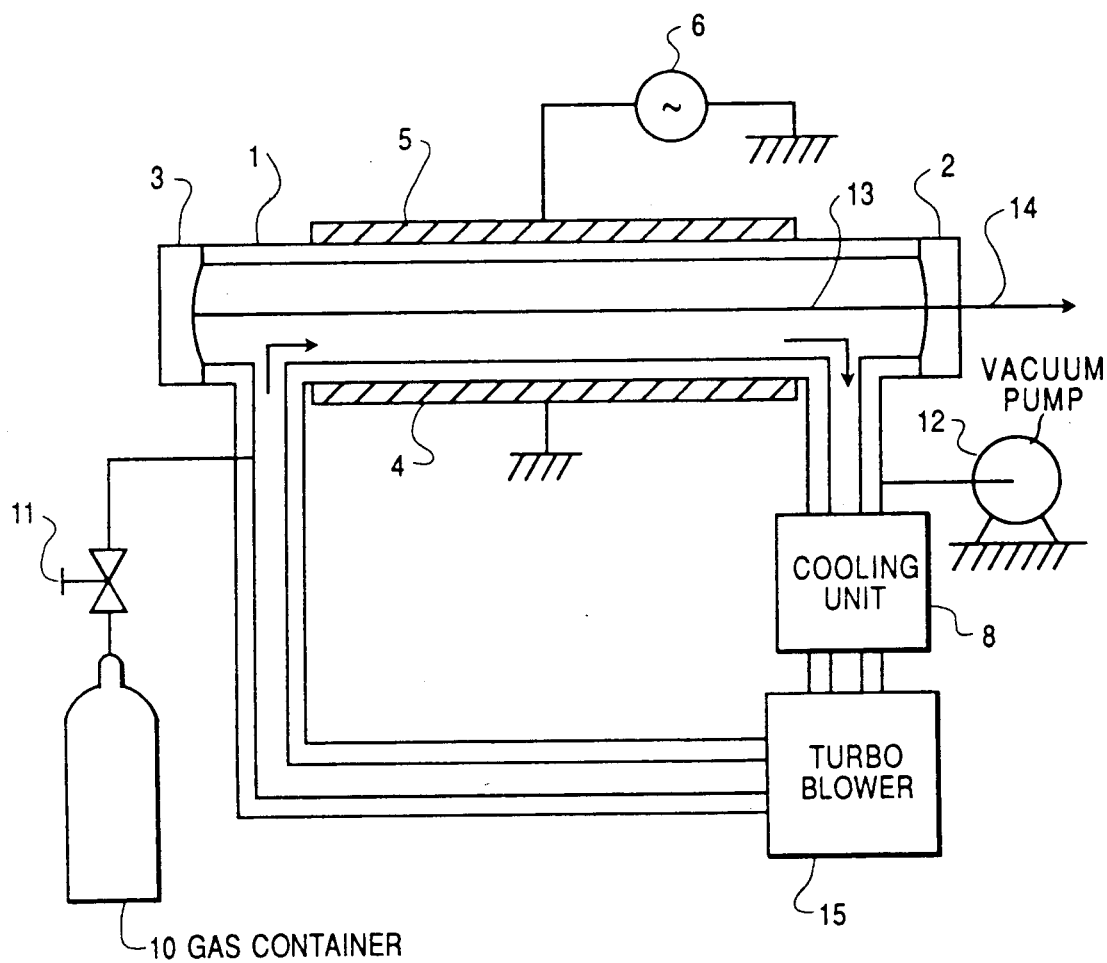
FIG. 1 is a diagrammatic view showing an entire arrangement of a gas laser oscillator device according to one embodiment of the present invention.

Referring to the drawings, shown in FIG. 1 is an entire arrangement of a gas laser oscillator device according to an embodiment of the present invention.

Figure 3:
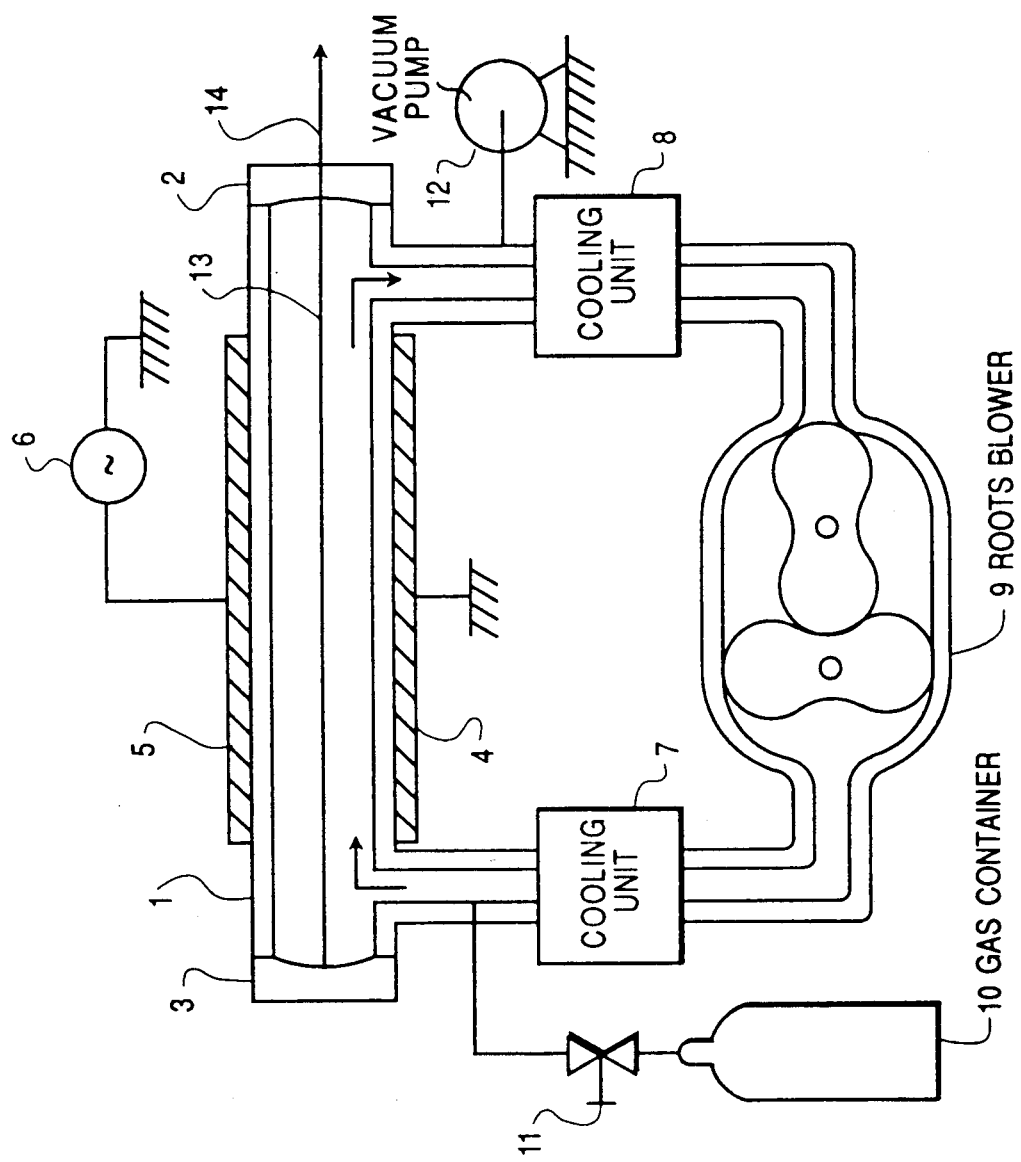
FIG. 3 is a diagrammatic view showing an arrangement of a conventional gas laser oscillator device.

Those parts in FIG. 1 which are substantially identical in structure and operation to those of FIG. 3 are denoted by identical reference numerals and will not be described in detail below. In FIG. 1, a turbo blower 15 is used instead of the Roots blower 9, and since the turbo blower has a much greater efficiency than the Roots blower, the heat produced by the compression of the laser gas is negligible, and accordingly, the cooling unit 7 shown at the downstream side in FIG. 3 can be omitted. Namely, the second cooling unit is omitted in FIG. 1, but may be provided if needed.

Figure 2:
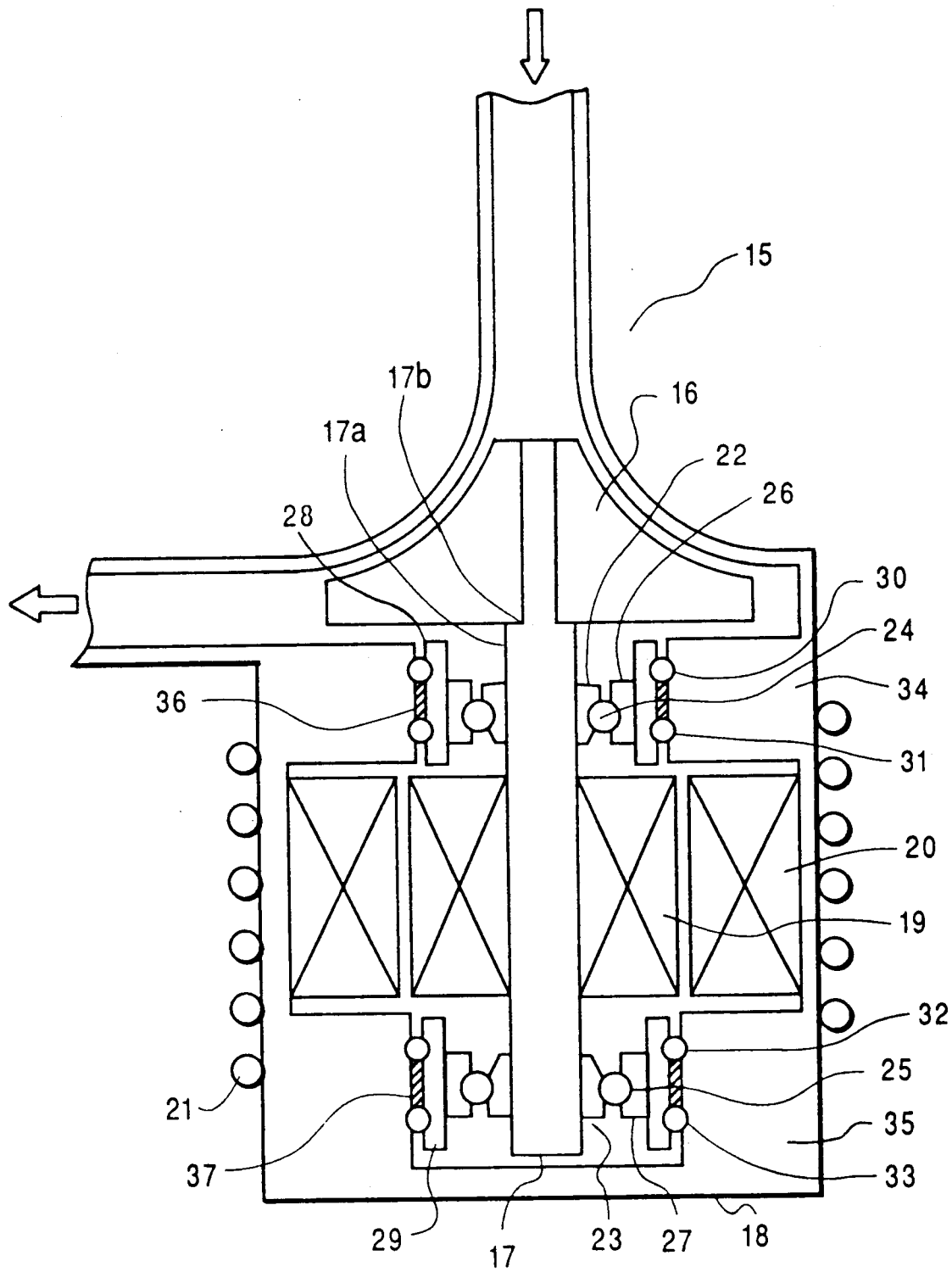
FIG. 2 is a diagrammatic view showing an example of an arrangement of a turbo blower.

FIG. 2 shows an example of an arrangement of the turbo blower. The turbo impeller 16 is shown as a centrifugal impeller, but may be a mixed flow impeller or an axial-flow impeller. The impeller 16 is mounted to a shaft 17 and rotated at a high speed of about 100,000 r.p.m. by motors 19 and 20 arranged in a casing 18, which is separate from a casing in which the laser gas flows. Accordingly, the size of the turbo blower is smaller than that of a Roots blower, which rotates at a lower speed, as the size is in inverse proportion to the rotational speed.

The present invention is chiefly characterized in that the resonance of the blower during a high-speed rotation operation can be prevented. In FIG. 2, the illustrated embodiment employs ball bearings, which comprise inner races 22 and 23 secured to the shaft 17, and balls 24 and 25. Note, in practice, many more balls than illustrated are used. Numerals 26 and 27 denote outer races of the bearings secured to sleeves 28 and 29, respectively.

The feature of the invention resides in that the sleeves 28 and 29 are not secured to bearing housings 34 and 35. If the sleeves are not secured to the housing, the following disadvantages arise; first-, second-, and third-order critical speeds of the shaft 17 occur sequentially when the rotational speed thereof is increased, and a rotating element, if not perfectly balanced during rotation, may be damaged due to centrifugal force when the rotational speed thereof passes across the critical speed. Generally, the third-order critical speed can be designed to be sufficiently high compared to the usual range of rotational speed, but measures must be taken against the vibration occurring at the first- and second-order speeds. Accordingly, there is a demand for the elimination of the need to adjust the balance of rotation and to machine the housing with a high accuracy.

According to the present invention, the sleeves are not secured to the bearing housing, and a gap of 10 to 100 μm is provided between the two elements, which gap is filled with grease to dampen the vibration of the sleeves due to the inelastic property thereof. In FIG. 2, the grease is indicated by hatching and numerals 36 and 37. According to the invention, the bearings are located in the laser gas, and therefore, to avoid contamination of the laser gas, grease having a small evaporation pressure is used as the dampening material. Further, to prevent scattering of the grease, the grease-filled region is externally sealed by two pairs of O-rings 30, 31 and 32, 33. Although ball bearings are used in the illustrated example, plain bearings may be used instead, and further, oil may be used instead of grease.

Due to the use of the dampers having the above structure, a gap of several tens of microns exists between the sleeve and the bearing housing. Accordingly, the extremely precise finish essential when machining the conventional housing becomes unnecessary, thus facilitating the machining process. In FIG. 2, a cooling water coil 21 is wound around the housings 34 and 35, to water-cool the electric motor.

With the above-described arrangement, the vibration produced when the impeller 16 and the shaft 17 are rotated is reduced by a hydrodynamic damping effect of the squeezed-film dampers.

The damping coefficient of the squeezed-film damper is expressed by the following formula:

$$C = \pi \mu R (L/S)^3$$

where
$\pi$ = ratio of the circumference to the diameter (3.14...)
$\mu$ = viscosity
$R$ = radius of damper
$L$ = length of damper
$S$ = radial clearance.

Therefore, the damping coefficient can be changed by varying the viscosity, the radius or length of the damper, or the radial clearance. The most practical means among these factor is to change the radial clearance.

In connection with the mode of vibration of the shaft when the rotational speed passes across the critical speed, the amplitude of vibration is larger at the distal end of the shaft near the turbo impeller because the impeller is projected from the paired bearings, and accordingly, a large stress is produced at a portion 17a of the shaft close to the bearing.

Therefore, by making the damping coefficient of one damper at the impeller side smaller than that of the other, vibration of the bearing at the impeller side is increased, and thus the stress produced in the shaft portion 17a close to that bearing is reduced. Particularly, damage to a portion 17b of the shaft 17 at which the diameter changes, due to a concentration of the stress thereat, can be prevented. Although ball bearings are used in the illustrated arrangement, plain bearings may be used instead.

The present invention is particularly useful for a high-frequency discharge pumping $CO_2$ laser. If a DC electric discharge is used for laser excitation, then a turbulent flow must be produced in the laser gas to obtain a uniform electric discharge. A Roots blower is best suited to such an application, since such a blower requires a high compression ratio. But if a high-frequency electric discharge is required for laser excitation, then it is not necessary to provide a turbulent flow in the laser gas, and accordingly, a turbo blower having a low compression ratio and a high discharge capacity is more effective for the purpose.

According to the present invention, as described above, a turbo blower is used in which squeezed-film dampers are provided for the rotary shaft of the turbo blower, and therefore, the size and weight of the blower, and thus the entire system, can be reduced. Further, since the vibration of the blower and the pulsating gas flow are eliminated, the laser has improved beam characteristics such as spot positioning stability and output stability during a high-speed operation, etc. Moreover, damage due to resonance, which is usually inevitable during a high speed rotation operation, can be avoided.

The dampers are mounted to a pair of bearings, and the damping coefficient of one damper is different from that of the other, whereby vibration of the bearings is reduced, the spot positioning stability of the laser beam improved, and the service life of the bearings prolonged.

Furthermore, the possibility of damage to the shaft is reduced, and therefore, it is possible to provide a small-sized high-efficiency turbo blower having an impeller which can be rotated at a high speed.

We claim:

1. A gas laser oscillator device having an electric discharge tube for producing an electric discharge in a laser gas contained in the electric discharge tube for laser excitation, an optical resonator for effecting laser oscillation, and a gas circulating device having a gas blower and a cooling unit for forcibly cooling the laser gas, said blower comprises a turbo impeller mounted on a shaft and rotatable in the laser gas and an electric motor for rotating said shaft to drive said turbo impeller, said shaft being supported by bearings provided with a squeezed-film damper filler with grease whereby vibration of the blower is reduced.

2. A gas laser oscillator device according to claim 1, wherein a region in which the grease is filler is externally sealed by an O-rings.

3. A gas laser oscillator device according to claim 1, wherein said bearings each comprise a ball bearing.

4. A gas laser oscillator device according to claim 1, wherein said bearings each comprise a plain bearing.

5. A turbo blower for a laser, comprising a motor which includes a shaft having a distal end to which a turbo impeller is mounted, a pair of bearings for supporting the shaft, a rotor, and a stator, wherein a squeezed film damper is provided around each of said bearings whereby vibration of the blower is reduced.

6. A turbo blower according to claim 5, wherein one of said squeezed-film dampers is closer to said turbo impeller than the other of said squeezed film dampers and the damping coefficient of said one of said squeezed-film dampers closer to said turbo impeller is smaller than that of the other squeezed-film damper.

7. A turbo blower according to claim 5, wherein said bearings each comprise a ball bearing.

8. A turbo blower according to claim 5, wherein said bearings each comprise a plain bearing.

9. A turbo blower according to claim 5, which further includes a sleeve and a housing around each bearing, with a clearance between said sleeve and said housing, said squeezed-film damper being positioned in said clearance.

10. A turbo blower according to claim 9, wherein the damping coefficient of each of said squeezed film dampers is changed by varying said clearance.

11. A turbo blower according to claim 10, wherein said clearance is filled with grease.

12. A turbo blower according to claim 11, wherein said clearance is externally sealed by O-rings.

13. A turbo blower according to claim 5, wherein the damping coefficient of one of said squeezed-film dampers is different from the damping coefficient of the other of said squeezed-film dampers.

* * * * *

UNITED STATES PATENT AND TRADEMARK OFFICE
CERTIFICATE OF CORRECTION

PATENT NO. : 5,022,039
DATED : June 4, 1991
INVENTOR(S) : NORIO KARUBE and TSUTOMU FUNAKUBO It is certified that error appears in the above-identified patent and that said Letters Patent is hereby corrected as shown below:

Title page: [57] ABSTRACT, line 4, "(19(," should be --(19),--.

Column 4, line 22, "factor" should be --factors--.

Column 6, line 3, "squeezed film" should be --squeezed-film--;

Signed and Sealed this

Eighth Day of December, 1992

Attest:

DOUGLAS B. COMER

Attesting Officer

Acting Commissioner of Patents and Trademarks